United States Patent
Hamada (10) Patent No.: US 12,552,288 B2
(45) Date of Patent: Feb. 17, 2026

(54) BATTERY VOLTAGE EQUALIZATION DEVICE

(71) Applicant: FDK CORPORATION, Tokyo (JP)

(72) Inventor: Kenji Hamada, Tokyo (JP)

(73) Assignee: FDK CORPORATION, Tokyo (JP)

( * ) Notice: Subject to any disclaimer, the term of this patent is extended or adjusted under 35 U.S.C. 154(b) by 705 days.

(21) Appl. No.: 17/907,258

(22) PCT Filed: Jan. 27, 2021

(86) PCT No.: PCT/JP2021/002700
§ 371 (c)(1),
(2) Date: Sep. 23, 2022

(87) PCT Pub. No.: WO2021/199626
PCT Pub. Date: Oct. 7, 2021

(65) Prior Publication Data
US 2024/0217393 A1    Jul. 4, 2024

(30) Foreign Application Priority Data

Mar. 31, 2020    (JP) .................. 2020-063427

(51) Int. Cl.
*B60L 58/22* (2019.01)
*B60L 58/12* (2019.01)
*H02J 7/00* (2006.01)

(52) U.S. Cl.
CPC ............... *B60L 58/22* (2019.02); *B60L 58/12* (2019.02); *H02J 7/0047* (2013.01); *H02J 7/00714* (2020.01); *H02J 7/007194* (2020.01)

(58) Field of Classification Search
CPC .......... H02J 7/0014; H02J 7/00; H02J 7/0024; H02J 7/0068; H02J 7/00034; H02J 7/0016;
(Continued)

(56) References Cited

U.S. PATENT DOCUMENTS

2013/0069596 A1    3/2013 Ochiai
2013/0293006 A1    11/2013 Kang et al.
(Continued)

FOREIGN PATENT DOCUMENTS

EP        2744067 A1     6/2014
JP      H11176483 A     7/1999
(Continued)

OTHER PUBLICATIONS

Extended European Search Report dated Apr. 4, 2024, for corresponding European Patent Application No. 21781825.2.
(Continued)

*Primary Examiner* — Binh C Tat
(74) *Attorney, Agent, or Firm* — Kinney & Lange, P.A.

(57) ABSTRACT

A battery voltage equalization device for an automotive battery formed from a plurality of batteries connected in series includes: a voltage measurement unit that measures respective battery voltages of the batteries; a current measurement unit that measures a charge-discharge current of the automotive battery; a cell balancing unit that equalizes the respective battery voltages of the batteries; and a control unit that performs a voltage equalization control through the cell balancing unit on the basis of the battery voltages measured by the voltage measurement unit. The control unit starts the voltage equalization control on the condition that the voltage equalization control is determined to be necessary on the basis of the respective battery voltages and that a discharge current of the automotive battery measured by the current measurement unit is determined to be stable.

10 Claims, 5 Drawing Sheets

(58) Field of Classification Search
CPC ...... H02J 7/0048; H02J 7/0019; H02J 7/0047;
H02J 7/007194; H02J 7/00302; H02J
7/00306; H02J 7/005; H02J 7/00714;
H02J 7/007182; H02J 7/0013; H02J
7/0031; H02J 7/007; H02J 7/0063; H02J
7/0025; H02J 7/00309; H02J 2207/20;
H02J 7/0018; H02J 7/00036; H02J 4/00;
H02J 7/00047; H02J 7/0036; H02J
7/0045; H02J 7/0069; B60L 58/22; B60L
2240/547; B60L 3/0046; B60L 50/64;
B60L 58/19; B60L 58/10; B60L 58/14;
B60L 58/18; B60L 58/13; B60L 58/16;
B60L 50/50; B60L 58/21; B60L 58/12;
B60L 58/15; B60L 58/20; B60L 58/26;
B60L 58/27; B60L 58/25; B60L 58/24
USPC .................................................. 320/116–123
See application file for complete search history.

(56) References Cited

U.S. PATENT DOCUMENTS

| 2014/0210415 | A1 | 7/2014 | Ohmori | |
| 2015/0035495 | A1* | 2/2015 | Yoshida | H01M 10/486 320/134 |
| 2015/0231986 | A1* | 8/2015 | Li | B60L 58/13 903/903 |
| 2016/0105042 | A1* | 4/2016 | Taylor | H01M 10/446 320/134 |
| 2020/0001740 | A1 | 1/2020 | Koda et al. | |
| 2022/0163592 | A1* | 5/2022 | Barsukov | G01R 31/3842 |

FOREIGN PATENT DOCUMENTS

| JP | 2006049198 A | 2/2006 |
| KR | 19990050662 A | 7/1999 |
| WO | 2005053132 A1 | 6/2005 |
| WO | 2015072276 A1 | 5/2015 |

OTHER PUBLICATIONS

Extended European Search Report dated Apr. 4, 2024, for corresponding European Patent Application No. 21781825.1, 8 pages.
International Search Report and Written Opinion dated Mar. 30, 2021, for corresponding PCT Application No. PCT/JP2021/002700.

* cited by examiner

BATTERY VOLTAGE EQUALIZATION DEVICE

CROSS-REFERENCE TO RELATED APPLICATION(S)

This application is the national phase of PCT Application No. PCT/JP2021/002700 filed on Jan. 27, 0221 which claims priority to Japanese Application No. 2020-063427 filed on Mar. 31, 2020, the contents of which are incorporated herein by reference in their entirety.

BACKGROUND

Technical Field

The present disclosure relates to a battery voltage equalization device.

Background Art

In a moving body such as an electric vehicle, a battery pack containing a lithium-ion battery, for example, is installed onboard as a traction power source. In such a battery pack, a plurality of battery cells are connected in series such that a desired voltage can be outputted. However, it is known that if the respective battery voltages of the plurality of battery cells connected in series become uneven, problems such as a limitation on the amount of electric energy that can be charged or discharged occur. For this reason, in such a battery pack, battery voltage equalization is often performed by a cell balancing circuit as disclosed in Patent Document 1, for example.

More specifically, Patent Document 1 discloses a transformer-type active cell balancing circuit that controls the electrical continuity of a transformer that can convert the output voltage of the battery pack to apply a charging voltage to each of the battery cells, and thereby charges battery cells with a relatively low battery voltage to equalize the battery voltages.

PRIOR ART DOCUMENT

Patent Document

Patent Document 1: Japanese Patent Laid-Open No. 11-176483

SUMMARY

In an automotive battery configured as a battery pack, the battery voltages of the battery cells are not stable while the moving body is in motion, and therefore cell balancing control is executed while the moving body is stopped, such as the state when the ignition is off, for example. For this reason, in a cell balancing circuit of the related art, if a vehicle is driven for relatively long times, there may be fewer opportunities to perform the cell balancing control, and variations in the battery voltages of the battery pack may be enlarged. Also, in a cell balancing circuit of the related art, the cell balancing control is performed by receiving information expressing the speed and the ignition state, for example, from the vehicle side, and therefore a complicated control and configuration for exchanging signals with the vehicle may be necessary.

The present disclosure has been devised in the light of such circumstances, and an object thereof is to provide a battery voltage equalization device that can ensure opportunities for performing a cell balancing control on an automotive battery pack even while the vehicle is in motion, without exchanging signals with the vehicle side.

In order to achieve the above object, an aspect of the present disclosure is directed to a battery voltage equalization device for an automotive battery formed from a plurality of batteries connected in series, the battery voltage equalization device including: a voltage measurement unit that measures respective battery voltages of the batteries; a current measurement unit that measures a charge-discharge current of the automotive battery; a cell balancing unit that equalizes the respective battery voltages of the batteries; and a control unit that performs a voltage equalization control through the cell balancing unit on the basis of the battery voltages measured by the voltage measurement unit, wherein the control unit starts the voltage equalization control on the condition that the voltage equalization control is determined to be necessary on the basis of the respective battery voltages and that a discharge current of the automotive battery measured by the current measurement unit is determined to be stable.

According to the present disclosure, it is possible to provide a battery voltage equalization device that can ensure opportunities for performing a cell balancing control on an automotive battery pack even while the vehicle is in motion, without exchanging signals with the vehicle side.

DETAILED DESCRIPTION

Hereinafter, embodiments of the present disclosure will be described in detail and with reference to the diagrams. Note that the present disclosure is not limited to the content described hereinafter, and modifications may be carried out freely in a scope that does not change the gist of the present disclosure. Also, the drawings used in the description of the embodiment are all schematic illustrations of component members that have been partially emphasized, enlarged, reduced, omitted, or the like to deepen understanding, and are not accurate representations of the scale, shape, and the like of the component members.

First Embodiment

Figure 1:
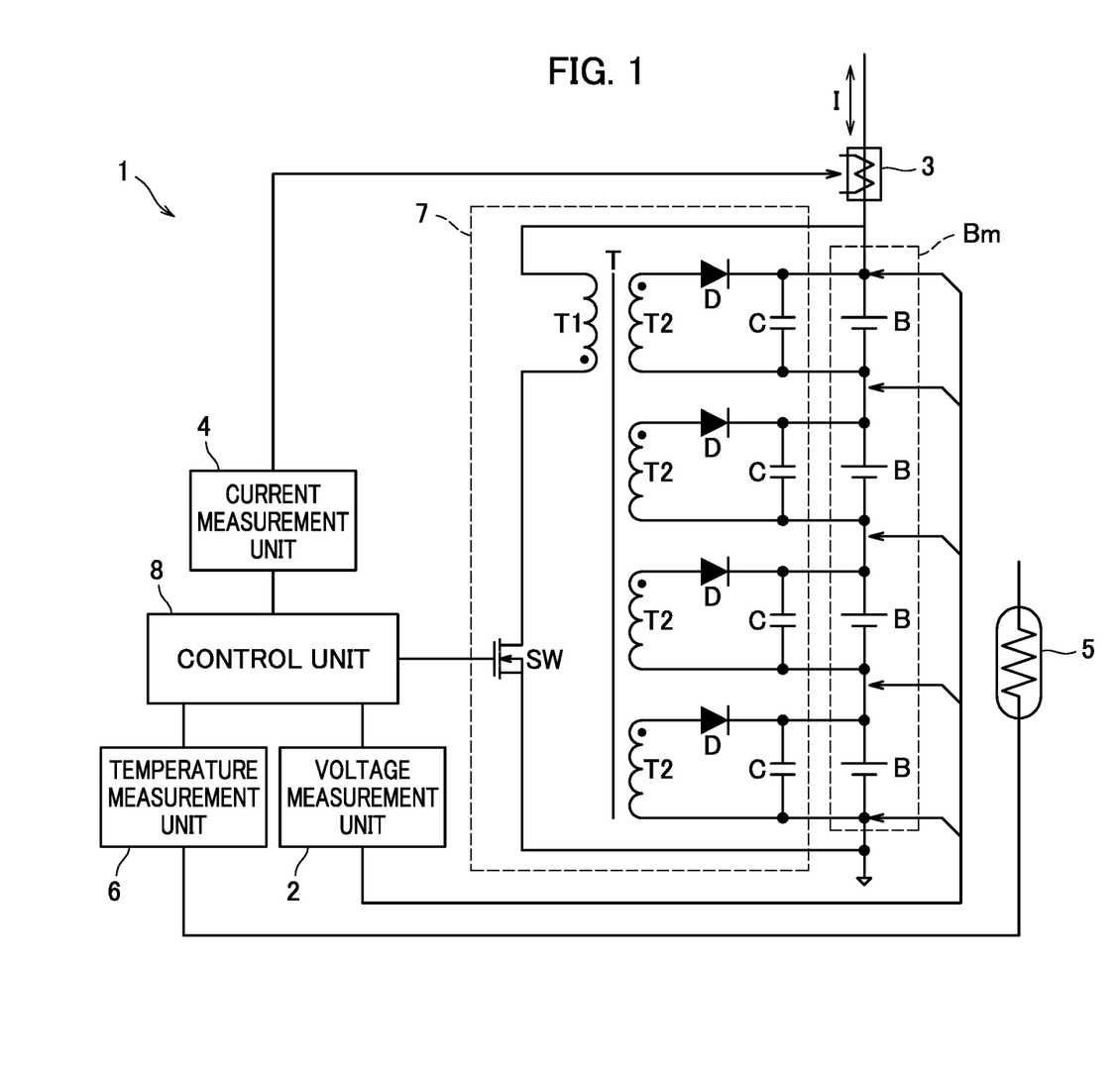
FIG. 1 is an overall configuration diagram illustrating a circuit of a battery voltage equalization device.

FIG. 1 is an overall configuration diagram illustrating a circuit of a battery voltage equalization device 1. The battery voltage equalization device 1 is a transformer-type active cell balancing circuit that is connected to an automotive battery Bm formed from a plurality of batteries B connected in series, and thereby equalizes the respective battery voltages of the batteries B. The battery voltage equalization device 1 is installed onboard an electric vehicle and executes a cell balancing control as needed on the automotive battery Bm which is used as a traction power source for the electric vehicle.

Here, each of the batteries B may be a secondary battery formed from a single battery cell or a secondary battery that is itself a battery pack in which a plurality of battery cells are connected in series. Also, although the automotive battery Bm is described as one in which four batteries B are connected in the present embodiment, the number of connected batteries B can be changed freely. Furthermore, the battery voltage equalization device 1 does not have to be of the transformer type, and may also be a passive cell balancing circuit, irrespective of the mode of the cell balancing control.

The battery voltage equalization device 1 is provided with a voltage measurement unit 2, a current sensor 3, a current measurement unit 4, a temperature sensor 5, a temperature measurement unit 6, a cell balancing unit 7, and a control unit 8.

The voltage measurement unit 2 measures the battery voltage of each of the plurality of batteries B, and outputs the battery voltages as digital values to the control unit 8 described later. The current sensor 3 is provided on a conductive pathway leading from the automotive battery Bm through an inverter to a motor of the vehicle (neither of which is illustrated), and acquires a charge-discharge current I of the automotive battery Bm. The current measurement unit 4 converts the analog value of the charge-discharge current acquired by the current sensor 3 into a digital value, and outputs the digital value to the control unit 8.

The temperature sensor 5 is provided at a position close to the automotive battery Bm, and acquires the battery temperature of the automotive battery Bm. The temperature measurement unit 6 converts the analog value of the battery temperature T acquired by the temperature sensor 5 into a digital value, and outputs the digital value to the control unit 8.

In the present embodiment, the cell balancing unit 7 includes a transformer T, a switch SW, a plurality of diodes D, and a plurality of capacitors C, and performs the cell balancing control on the automotive battery Bm on the basis of control from the control unit 8 described later.

The transformer T includes a primary winding T1 into which the output voltage of the automotive battery Bm is inputted and a plurality of secondary windings T2 corresponding to each of the batteries B. The energization of the transformer T is controlled by the switch SW provided between the transformer T and the automotive battery Bm, whereby the output voltage of the automotive battery Bm is converted into AC power and inputted into the primary winding T1. Also, the transformer T converts the voltage inputted into the primary winding T1 to charging voltages for charging each of the batteries B, and outputs the charging voltages to the respective secondary windings T2.

In the present embodiment, the switch SW is an N-channel metal-oxide-semiconductor field-effect transistor (MOSFET), of which the drain is connected to end of the primary winding T1, the source is connected to the minus side of the battery pack BP, and the gate is connected to the control unit 8 described later. Additionally, the switch SW is controlled on/off continuously by the control unit 8, whereby the energization of the transformer T can be controlled as above.

The diode D and the capacitor C are provided as a rectifier-smoothing circuit on the conductive pathway from each secondary winding T2 to each battery B, and converts an AV voltage outputted by each secondary winding T2 to a DC voltage to create a charging voltage for charging an individual battery B.

The control unit 8 is formed from a microcontroller circuit including a timer not illustrated, for example, and determines whether voltage equalization is necessary on the basis of the respective battery voltages of the batteries B. In the case of determining that voltage equalization is necessary, the control unit 8 outputs a PWM signal to the switch SW of the cell balancing unit 7 to execute the cell balancing control on the condition that the charge-discharge current I of the automotive battery Bm is determined to be stable, as described in detail later. Also, in the case of determining that voltage equalization is not necessary, or in the case where variations in the battery voltages are resolved during the execution of the cell balancing control, the control unit 8 stops the signal output to the switch SW.

Here, the determination of whether voltage equalization is necessary can be made according to how the respective battery voltages vary, and for example, the determination can be made according to the difference between the maximum value and the minimum value of the battery voltages or a standard such as whether the standard deviation of the battery voltages is equal to or greater than a prescribed threshold value.

Also, in the case where the battery temperature measured by the temperature measurement unit 6 is equal to or greater than a prescribed temperature threshold value, the control unit 8 prohibits the voltage equalization control regardless of whether the cell balancing control is being executed. In other words, the control unit 8 stops the cell balancing control if the battery temperature becomes equal to or greater than the temperature threshold value during the execution of the cell balancing control. Here, the prescribed temperature threshold value refers to a threshold value for the battery temperature freely set in advance for monitoring such that the temperature does not go high enough to promote degradation of the batteries B.

Next, the conditions for executing the cell balancing control will be described. As described above, the control unit 8 executes the cell balancing control even if the ignition of the vehicle is not in the off-state, on the condition that voltage equalization is determined to be necessary on the basis of the battery voltages and that the charge-discharge current I of the automotive battery Bm is determined to be stable. Here, a case will be described in which the ignition is in the on-state, voltage equalization is necessary, and the voltage equalization is not completed during the execution of the cell balancing control.

Figure 2:
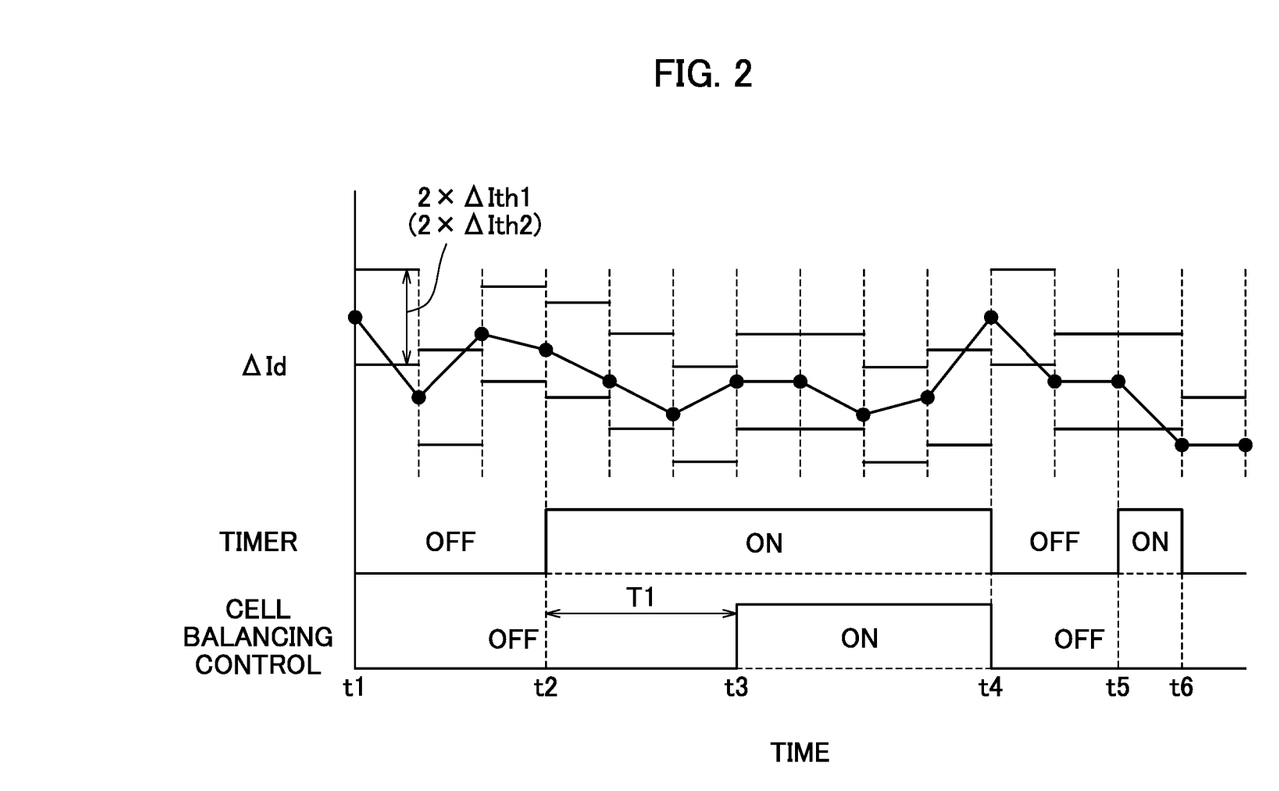
FIG. 2 is a timing chart in the case of executing a cell balancing control on the basis of a current stability determination condition according to a first embodiment.

FIG. 2 is a timing chart in the case of executing the cell balancing control on the basis of a current stability determination condition according to the first embodiment. More specifically, FIG. 2 illustrates the execution timings of the cell balancing control with respect to the change $\Delta Id$ in the discharge current Id of the automotive battery Bm while the vehicle is in a moving state. Note that the control unit 8 can distinguish whether the charge-discharge current I is the discharge current Id or the charge current Ic on the basis of the direction of the current flowing through the current sensor 3.

In the present embodiment, the control unit 8 determines that the discharge current Id of the automotive battery Bm is stable and starts the voltage equalization control if the change $\Delta Id$ in the discharge current Id remains smaller than a prescribed first change threshold value $\Delta Ith1$ for a prescribed first period T1. Also, the control unit 8 ends the voltage equalization control on the condition that the change ΔId in the discharge current Id exceeds a prescribed second change threshold value ΔIth2 during the execution of the voltage equalization control.

Here, the prescribed first change threshold value ΔIth1 is a threshold value freely set in advance to determine, for the change ΔId in the discharge current Id sampled at regular intervals, whether the current change ΔId has changed significantly from the previous change ΔId. Also, the prescribed first period T1 is a threshold value freely set in advance to determine whether the change ΔId in the discharge current Id continues to remain in a state without changing significantly.

Additionally, the prescribed second change threshold value ΔIth2 is a threshold value freely set in advance to stop the voltage equalization control upon determining that the change ΔId in the discharge current Id has changed significantly again during the execution of the voltage equalization control.

Note that although the present embodiment illustrates an example in which the second change threshold value ΔIth2 is the same value as the first change threshold value ΔIth1, a value larger than the first change threshold value ΔIth1 can be set to further ensure an execution period for the voltage equalization control.

Describing operations for the situation in FIG. 2 in light of the above conditions, immediately after a timing t1, the change ΔId in the discharge current Id varies beyond the range of the first change threshold value ΔIth1 between samplings, and therefore the count of the first period T1 is not started by the timer of the control unit 8, nor is the cell balancing control started.

In contrast, at a timing t2, the change ΔId in the discharge current Id is inside the range of the first change threshold value ΔIth1 compared to the previous sampling value, and therefore the count of the first period T1 is started by the timer of the control unit 8.

Thereafter, if the change ΔId in the discharge current Id does not vary beyond the range of the first change threshold value ΔIth1 in the first period T1 from the timing t2 to a timing t3, the control unit 8 determines that the discharge current Id of the automotive battery Bm is stable, and starts the cell balancing control for the automotive battery Bm.

Also, at a timing t4, the change ΔId in the discharge current Id varies beyond the range of the second change threshold value ΔIth2 compared to the previous sampling value, and therefore the control unit 8 ends the cell balancing control for the automotive battery Bm and resets the count by the timer. Note that if voltage equalization is completed before the timing t4, the cell balancing control ends at that time.

A similar procedure is followed thereafter, and a count by the timer is started at a timing t5 when the change ΔId in the discharge current Id is inside the range of the first change threshold value ΔIth1 compared to the previous sampling value. However, at a timing t6, the change ΔId in the discharge current Id varies beyond the range of the first change threshold value ΔIth1 before the first period T1 elapses. For this reason, at the timing t6, the count by the timer is reset.

As above, according to the battery voltage equalization device 1 according to the first embodiment, by setting the first change threshold value ΔIth1, the second change threshold value ΔIth2, and the first period T1 in advance, the stability of the discharge current Id of the automotive battery Bm can be determined on the basis of the change ΔId in the discharge current Id.

Consequently, the battery voltage equalization device 1 can execute the cell balancing control for the automotive battery Bm when the discharge current Id is stable, even if the ignition of the vehicle is not turned off, and even if the vehicle is not in a state where the speed is zero, such as when idling. In other words, the battery voltage equalization device 1 can keep the automotive battery Bm in a favorable state without missing an opportunity to execute the cell balancing control, even in cases where the vehicle is driven at a steady speed over a long period, such as when traveling on a highway, for example.

Moreover, since the battery voltage equalization device 1 determines whether to execute the voltage equalization control on the basis of the change ΔId in the discharge current Id of the automotive battery Bm acquired in the current sensor 3, a complicated control and configuration for exchanging signals with the vehicle are unnecessary.

Consequently, according to the battery voltage equalization device 1 according to the first embodiment, opportunities for performing the cell balancing control on an automotive battery pack can be ensured even while the vehicle is in motion, without exchanging signals with the vehicle side.

Second Embodiment

Next, a battery voltage equalization device 1 according to a second embodiment will be described. In the battery voltage equalization device 1 according to the second embodiment, the current stability determination condition in the battery voltage equalization device 1 of the first embodiment described above is different from the first embodiment. Hereinafter, the portions that differ from the first embodiment will be described, whereas for components in common with the first embodiment, the same reference signs will be used and a detailed description will be omitted.

Figure 3:
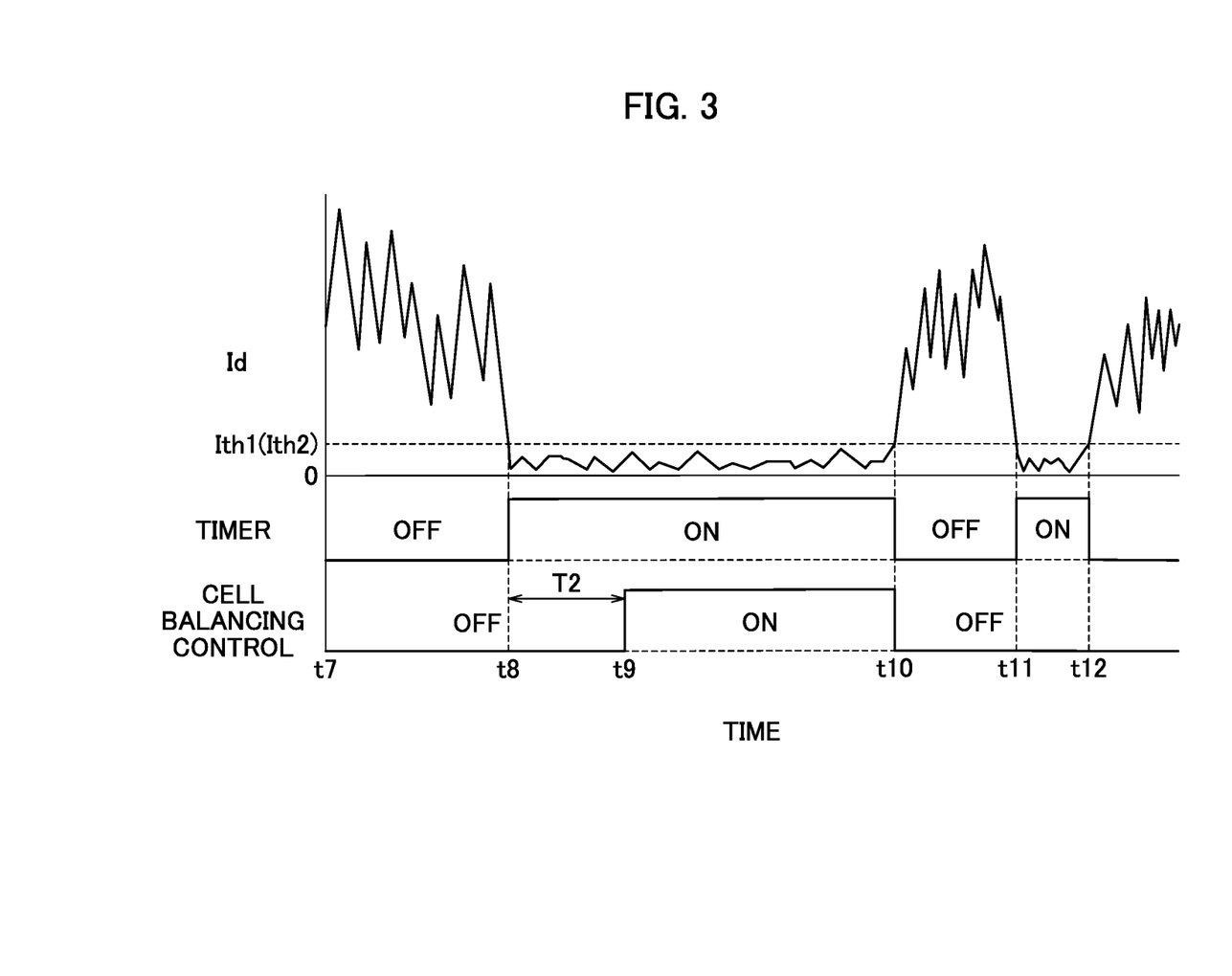
FIG. 3 is a timing chart in the case of executing a cell balancing control on the basis of current stability determination condition according to a second embodiment.

FIG. 3 is a timing chart in the case of executing the cell balancing control on the basis of a current stability determination condition according to the second embodiment. More specifically, FIG. 3 illustrates the execution timings of the cell balancing control with respect to the discharge current Id of the automotive battery Bm while the vehicle is in a moving state.

In the present embodiment, the control unit 8 determines that the discharge current Id of the automotive battery Bm is stable and starts the voltage equalization control if the discharge current Id remains less than a prescribed first current threshold value Ith1 for a prescribed second period T2. Also, the control unit 8 ends the voltage equalization control on the condition that the discharge current Id exceeds a prescribed second current threshold value Ith2 during the execution of the voltage equalization control.

Here, the prescribed first current threshold value Ith1 is a threshold value freely set in advance to determine, for the discharge current Id sampled at regular intervals, whether the vehicle is in a state in which not much power from the automotive battery Bm is consumed, such as an idling state associated with waiting for a traffic signal to change, or a downhill driving state. Also, the prescribed second period T2 is a threshold value freely set in advance to determine whether the discharge current Id continues to be relatively low.

Additionally, the prescribed second current threshold value Ith2 is a threshold value freely set in advance to stop the voltage equalization control upon determining that the discharge current Id has increased again during the execution of the voltage equalization control.

Note that although the present embodiment illustrates an example in which the second current threshold value Ith2 is the same value as the first current threshold value Ith1, a value larger than the first current threshold value Ith1 can be set to further ensure an execution period for the voltage equalization control.

Describing operations for the situation in FIG. 3 in light of the above conditions, immediately after a timing t7, the discharge current Id is equal to or greater than the first current threshold value Ith1, and therefore the count of the second period T2 is not started by the timer of the control unit 8, nor is the cell balancing control started.

In contrast, at a timing t8, the discharge current Id is less than the first current threshold value Ith1, and therefore the count of the second period T2 is started by the timer of the control unit 8.

Thereafter, if the discharge current Id is less than or equal to the first current threshold value Ith1 in the second period T2 from the timing 18 to a timing t9, the control unit 8 determines that the discharge current Id of the automotive battery Bm is stable, and starts the cell balancing control for the automotive battery Bm.

Also, at a timing t10, the discharge current Id exceeds the second current threshold value Ith2, and therefore the control unit 8 ends the cell balancing control for the automotive battery Bm and resets the count by the timer. Note that if voltage equalization is completed before the timing t10, the cell balancing control ends at that time.

A similar procedure is followed thereafter, and a count by the timer is started at a timing t11 when the discharge current Id goes below the first current threshold value Ith1. However, at a timing t12, the discharge current Id exceeds the first current threshold value Ith1 before the second period T2 elapses. For this reason, at the timing t12, the count by the timer is reset.

As above, according to the battery voltage equalization device 1 according to the second embodiment, by setting the first current threshold value Ith1, the second current threshold value Ith2, and the second period T2 in advance, the stability of the discharge current Id of the automotive battery Bm can be determined. Consequently, similarly to the battery voltage equalization device 1 according to the first embodiment, the battery voltage equalization device 1 according to the second embodiment can ensure opportunities for performing the cell balancing control on an automotive battery pack even while the vehicle is in motion, without exchanging signals with the vehicle side.

Third Embodiment

Next, a battery voltage equalization device 1 according to a third embodiment will be described. The battery voltage equalization device 1 according to the third embodiment differs from the first embodiment or the second embodiment in that the cell balancing control is performed in a period of stable regenerative current during charging in the case where the automotive battery Bm can be charged with regenerative power from the vehicle side in the battery voltage equalization device 1 according to the first or second embodiment described above. Hereinafter, the portions that differ from the first embodiment will be described, whereas for components in common with the first embodiment or the second embodiment, the same reference signs will be used and a detailed description will be omitted.

Figure 4:
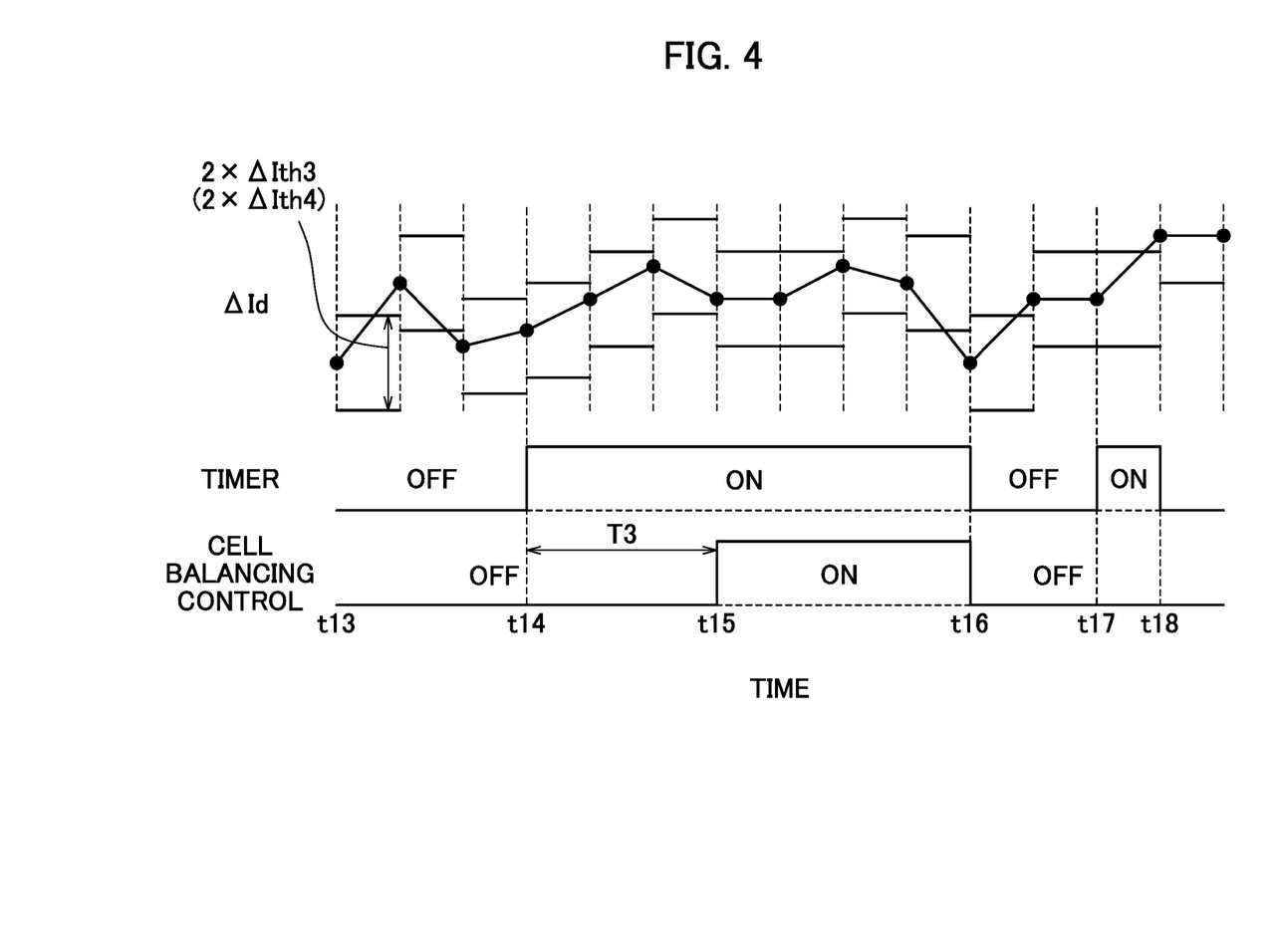
FIG. 4 is a timing chart in the case of executing a cell balancing control on the basis of a current stability determination condition according to a third embodiment.

FIG. 4 is a timing chart in the case of executing the cell balancing control on the basis of a current stability determination condition according to the third embodiment. More specifically, FIG. 4 illustrates the execution timings of the cell balancing control with respect to the change $\Delta Ic$ in the charge current Ic of the automotive battery Bm in the case where the vehicle is on a relatively long downhill slope and the automotive battery Bm is being charged regeneratively.

In the present embodiment, the control unit 8 determines that the charge current Ic of the automotive battery Bm is stable and starts the voltage equalization control if the change $\Delta Ic$ in the charge current Ic remains smaller than a prescribed third change threshold value $\Delta Ith3$ for a prescribed third period T3. Also, the control unit 8 ends the voltage equalization control on the condition that the change $\Delta Ic$ in the charge current Ic exceeds a prescribed fourth change threshold value $\Delta Ith4$ during the execution of the voltage equalization control.

Here, the prescribed third change threshold value $\Delta Ith3$ is a threshold value freely set in advance to determine, for the change $\Delta Ic$ in the charge current Ic sampled at regular intervals, whether the current change $\Delta Ic$ has changed significantly from the previous change $\Delta Ic$. Also, the prescribed third period T3 is a threshold value freely set in advance to determine whether the change $\Delta Ic$ in the charge current Ic continues to remain in a state without changing significantly.

Additionally, the prescribed fourth change threshold value $\Delta Ith4$ is a threshold value freely set in advance to stop the voltage equalization control upon determining that the change $\Delta Ic$ in the charge current Ic has changed significantly again during the execution of the voltage equalization control.

Note that although the present embodiment illustrates an example in which the fourth change threshold value $\Delta Ith4$ is the same value as the third change threshold value $\Delta Ith3$, a value larger than the third change threshold value $\Delta Ith3$ can be set to further ensure an execution period for the voltage equalization control.

Describing operations for the situation in FIG. 4 in light of the above conditions, immediately after a timing t13, the change $\Delta Ic$ in the charge current Ic varies beyond the range of the third change threshold value $\Delta Ith3$ between samplings, and therefore the count of the third period T3 is not started by the timer of the control unit 8, nor is the cell balancing control started.

In contrast, at a timing t14, the change $\Delta Ic$ in the charge current Ic is inside the range of the third change threshold value $\Delta Ith3$ compared to the previous sampling value, and therefore the count of the third period T3 is started by the timer of the control unit 8.

Thereafter, if the change $\Delta Ic$ in the charge current Ic does not vary beyond the range of the third change threshold value $\Delta Ith3$ in the third period T3 from the timing t14 to a timing t15, the control unit 8 determines that the charge current Ic of the automotive battery Bm is stable, and starts the cell balancing control for the automotive battery Bm.

Also, at a timing t16, the change $\Delta Ic$ in the charge current Ic varies beyond the range of the fourth change threshold value $\Delta Ith4$ compared to the previous sampling value, and therefore the control unit 8 ends the cell balancing control for the automotive battery Bm and resets the count by the timer. Note that if voltage equalization is completed before the timing t16, the cell balancing control ends at that time.

A similar procedure is followed thereafter, and a count by the timer is started at a timing t17 when the change $\Delta Ic$ in the charge current Ic is inside the range of the third change threshold value $\Delta Ith3$ compared to the previous sampling value. However, at a timing t18, the change $\Delta Ic$ in the charge current Ic varies beyond the range of the third change threshold value ΔIth3 before the third period T3 elapses. For this reason, at the timing t18, the count by the timer is reset.

As above, according to the battery voltage equalization device 1 according to the third embodiment, by setting the third change threshold value ΔIth3, the fourth change threshold value ΔIth4, and the third period T3 in advance, the stability of the charge current Ic of the automotive battery Bm can be determined on the basis of the change ΔIc in the charge current Ic.

Consequently, the battery voltage equalization device 1 can execute the cell balancing control for the automotive battery Bm when the charge current Ic from regenerative power is stable, even if the ignition of the vehicle is not turned off, and even if the vehicle is not in a state where the speed is zero, such as when idling. In other words, the battery voltage equalization device 1 can keep the automotive battery Bm in a favorable state without missing an opportunity to execute the cell balancing control, even in cases where the vehicle is driven downhill at a steady speed over a long period, such as when traveling on a highway, for example.

Moreover, since the battery voltage equalization device 1 determines whether to execute the voltage equalization control on the basis of the change ΔIc in the charge current Ic of the automotive battery Bm acquired in the current sensor 3, a complicated control and configuration for exchanging signals with the vehicle are unnecessary.

Consequently, according to the battery voltage equalization device 1 according to the third embodiment, opportunities for performing the cell balancing control on an automotive battery pack can be ensured even while the vehicle is in motion, without exchanging signals with the vehicle side.

Note that in the case where the vehicle stops at a charging stand to charge the automotive battery Bm, the charge current Ic supplied from the charging stand naturally has little or no variation, and therefore the configuration of the battery voltage equalization device 1 according to the present embodiment enables the cell balancing control to be performed while charging.

Fourth Embodiment

Next, a battery voltage equalization device 1 according to a fourth embodiment will be described. In the battery voltage equalization device 1 according to the fourth embodiment, the current stability determination condition in the battery voltage equalization device 1 of the third embodiment described above is different from the third embodiment. Hereinafter, the portions that differ from the third embodiment will be described, whereas for components in common with the third embodiment, the same reference signs will be used and a detailed description will be omitted.

Figure 5:
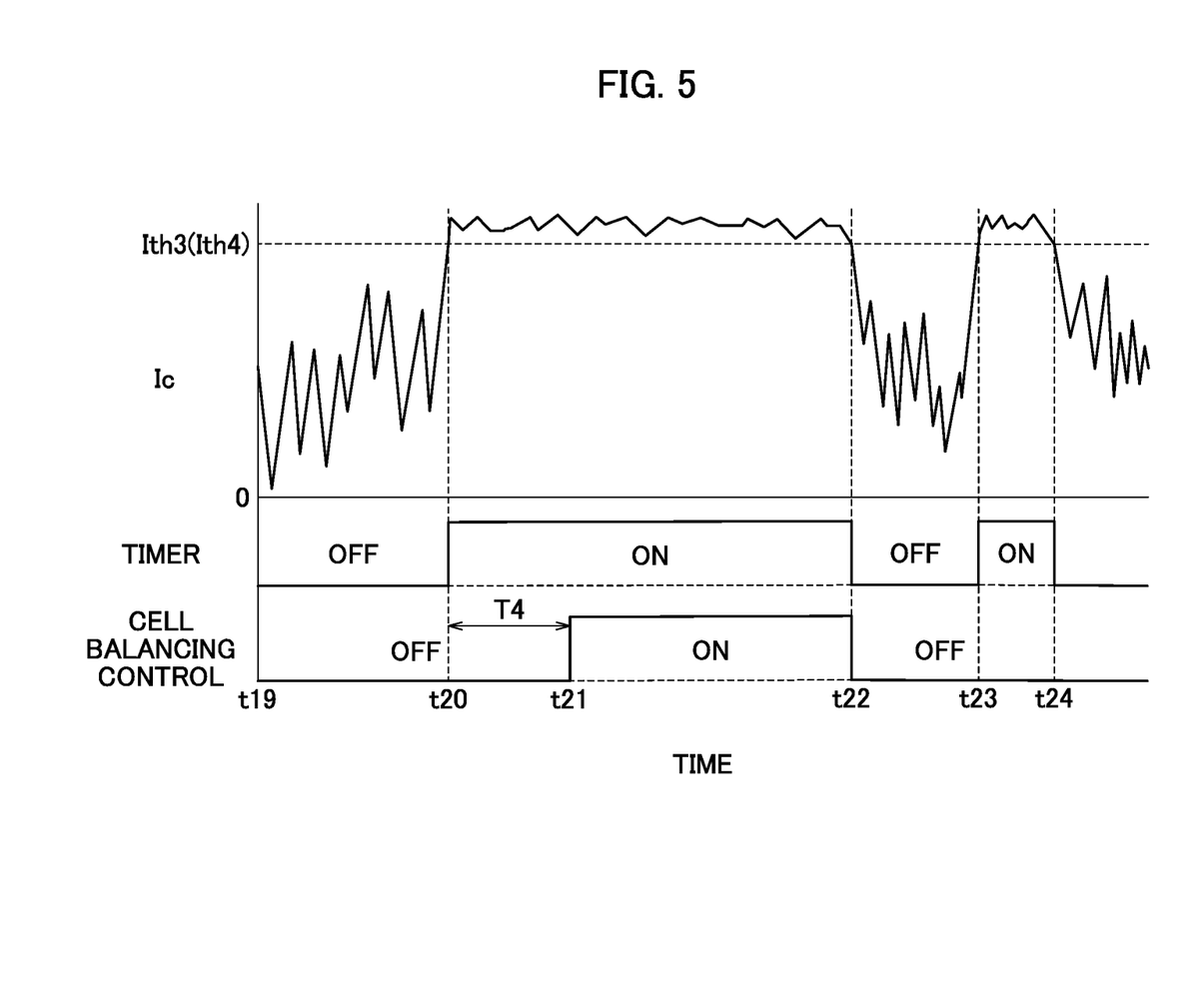
FIG. 5 is a timing chart in the case of executing a cell balancing control on the basis of a current stability determination condition according to a fourth embodiment.

FIG. 5 is a timing chart in the case of executing the cell balancing control on the basis of a current stability determination condition according to the fourth embodiment. More specifically, FIG. 5 illustrates the execution timings of the cell balancing control with respect to the charge current Ic of the automotive battery Bm in the case where the vehicle is on a relatively long downhill slope and the automotive battery Bm is being charged regeneratively.

In the present embodiment, the control unit 8 determines that the charge current Ic of the automotive battery Bm is stable and starts the voltage equalization control if the charge current Ic remains less than a prescribed third current threshold value Ith3 for a prescribed fourth period T4. Also, the control unit 8 ends the voltage equalization control on the condition that the charge current Ic falls below a prescribed fourth current threshold value Ith4 during the execution of the voltage equalization control.

Here, the prescribed third current threshold value Ith3 is a threshold value freely set in advance to determine whether the charge current Ic sampled at regular intervals is sufficiently large. Since the charge current Ic has an upper limit value on the current that can be regenerated, if the charge current Ic is sufficiently large, the charge current Ic will stabilize near the upper limit value. Also, the prescribed fourth period T4 is a threshold value freely set in advance to determine whether the charge current Ic continues to be stable.

Additionally, the prescribed fourth current threshold value Ith4 is a threshold value freely set in advance to stop the voltage equalization control upon determining that the charge current Ic has decreased again during the execution of the voltage equalization control.

Note that although the present embodiment illustrates an example in which the fourth current threshold value Ith4 is the same value as the third current threshold value Ith3, a value smaller than the third current threshold value Ith3 can be set to further ensure an execution period for the voltage equalization control.

Describing operations for the situation in FIG. 5 in light of the above conditions, immediately after a timing t19, the charge current Ic is less than or equal to the third current threshold value Ith3, and therefore the count of the fourth period T4 is not started by the timer of the control unit 8, nor is the cell balancing control started.

In contrast, at a timing t20, the charge current Ic is greater than the third current threshold value Ith3, and therefore the count of the fourth period T4 is started by the timer of the control unit 8.

Thereafter, if the charge current Ic exceeds the third current threshold value Ith3 in the fourth period T4 from the timing t20 to a timing t21, the control unit 8 determines that the charge current Ic of the automotive battery Bm is stable, and starts the cell balancing control for the automotive battery Bm.

Also, at a timing t22, the charge current Ic falls below the fourth current threshold value Ith4, and therefore the control unit 8 ends the cell balancing control for the automotive battery Bm and resets the count by the timer. Note that if voltage equalization is completed before the timing t22, the cell balancing control ends at that time.

A similar procedure is followed thereafter, and a count by the timer is started at a timing t23 when the charge current Ic goes above the third current threshold value Ith3. However, at a timing t24, the charge current Ic falls below the third current threshold value Ith3 before the fourth period T4 elapses. For this reason, at the timing t24, the count by the timer is reset.

As above, according to the battery voltage equalization device 1 according to the fourth embodiment, by setting the third current threshold value Ith3, the fourth current threshold value Ith4, and the fourth period T4 in advance, the stability of the charge current Ic of the automotive battery Bm can be determined. Consequently, similarly to the battery voltage equalization device 1 according to the fourth embodiment, the battery voltage equalization device 1 according to the third embodiment can ensure opportunities for performing the cell balancing control on an automotive battery pack even while the vehicle is in motion, without exchanging signals with the vehicle side.

This concludes the description of the embodiments, but the present technology is not limited to the above embodiments. For example, although the above embodiments illustrate an example of voltage equalization control based on the stability of the current value or the change therein sampled at regular intervals, the current value and the change may also be calculated according to the average of a plurality of measurement values measured in a preceding fixed period, otherwise known as a moving average. In this case, the battery voltage equalization device 1 can reduce the influence of noise and suppress malfunctions by averaging the measurement values.

Aspects of Present Disclosure

A first aspect of the present disclosure is a battery voltage equalization device for an automotive battery formed from a plurality of batteries connected in series, the battery voltage equalization device including: a voltage measurement unit that measures respective battery voltages of the batteries; a current measurement unit that measures a charge-discharge current of the automotive battery; a cell balancing unit that equalizes the respective battery voltages of the batteries; and a control unit that performs a voltage equalization control through the cell balancing unit on the basis of the battery voltages measured by the voltage measurement unit, wherein the control unit starts the voltage equalization control on the condition that the voltage equalization control is determined to be necessary on the basis of the respective battery voltages and that a discharge current of the automotive battery measured by the current measurement unit is determined to be stable.

A second aspect of the present disclosure is a battery voltage equalization device in which, in the first aspect of the present disclosure described above, the control unit determines that the discharge current is stable if a change in the discharge current remains smaller than a prescribed first change threshold value for a prescribed first period.

A third aspect of the present disclosure is a battery voltage equalization device in which, in the second aspect of the present disclosure described above, the control unit ends the voltage equalization control on the condition that the change in the discharge current exceeds a prescribed second change threshold value during the execution of the voltage equalization control.

A fourth aspect of the present disclosure is a battery voltage equalization device in which, in the first aspect of the present disclosure described above, the control unit determines that the discharge current is stable if the discharge current remains less than a prescribed first current threshold value for a prescribed second period.

A fifth aspect of the present disclosure is a battery voltage equalization device in which, in the fourth aspect of the present disclosure described above, the control unit ends the voltage equalization control on the condition that the discharge current exceeds a prescribed second current threshold value during the execution of the voltage equalization control.

A sixth aspect of the present disclosure is a battery voltage equalization device in which, in any of the first to fifth aspects of the present disclosure described above, the control unit starts the voltage equalization control on the condition that a charge current of the automotive battery measured by the current measurement unit is determined to be stable.

A seventh aspect of the present disclosure is a battery voltage equalization device in which, in the sixth aspect of the present disclosure described above, the control unit determines that the charge current is stable if a change in the charge current remains smaller than a prescribed third change threshold value for a prescribed third period.

An eighth aspect of the present disclosure is a battery voltage equalization device in which, in the seventh aspect of the present disclosure described above, the control unit ends the voltage equalization control on the condition that the change in the charge current exceeds a prescribed fourth change threshold value during the execution of the voltage equalization control while charging.

A ninth aspect of the present disclosure is a battery voltage equalization device in which, in the sixth aspect of the present disclosure described above, the control unit determines that the charge current is stable if the charge current remains greater than a prescribed third current threshold value for a prescribed fourth period.

A tenth aspect of the present disclosure is a battery voltage equalization device in which, in the ninth aspect of the present disclosure described above, the control unit ends the voltage equalization control on the condition that the charge current falls below a prescribed fourth current threshold value during the execution of the voltage equalization control while charging.

An eleventh aspect of the present disclosure is a battery voltage equalization device in which, in any of the first to tenth aspects of the present disclosure described above, a temperature measurement unit that measures a battery temperature of the automotive battery is provided, and the control unit prohibits the voltage equalization control if the battery temperature measured by the temperature measurement unit is equal to or greater than a prescribed temperature threshold value.

EXPLANATION OF REFERENCE SIGNS 1 battery voltage equalization device
2 voltage measurement unit
4 current measurement unit
7 cell balancing unit
8 control unit
B battery
Bm automotive battery
I charge-discharge current
Id discharge current
Ic charge current

The invention claimed is:

1. A battery voltage equalization device for an automotive battery formed from a plurality of batteries connected in series, the battery voltage equalization device comprising:
a voltage measurement unit that measures respective battery voltages of the batteries;
a current measurement unit that measures a charge-discharge current of the automotive battery;
a cell balancing unit that equalizes the respective battery voltages of the batteries; and
a control unit that performs a voltage equalization control through the cell balancing unit on a basis of the battery voltages measured by the voltage measurement unit,
wherein the control unit starts the voltage equalization control in response to the voltage equalization control being determined to be necessary on a basis of the respective battery voltages and a discharge current of the automotive battery measured by the current measurement unit being determined to be stable;
a temperature measurement unit that measures a battery temperature of the automotive battery, wherein the control unit prohibits the voltage equalization control if the battery temperature measured by the temperature measurement unit is equal to or greater than a prescribed temperature threshold value.

2. The battery voltage equalization device according to claim 1, wherein the control unit determines that the discharge current is stable if a change in the discharge current remains smaller than a prescribed first change threshold value for a prescribed first period.

3. The battery voltage equalization device according to claim 2, wherein the control unit ends the voltage equalization control in response to the change in the discharge current exceeding a prescribed second change threshold value during the execution of the voltage equalization control.

4. The battery voltage equalization device according to claim 1, wherein the control unit determines that the discharge current is stable if the discharge current remains less than a prescribed first current threshold value for a prescribed second period.

5. The battery voltage equalization device according to claim 4, wherein the control unit ends the voltage equalization control in response to the discharge current exceeding a prescribed second current threshold value during the execution of the voltage equalization control.

6. The battery voltage equalization device according to claim 1, wherein the control unit starts the voltage equalization control in response to a charge current of the automotive battery measured by the current measurement unit being determined to be stable.

7. The battery voltage equalization device according to claim 6, wherein the control unit determines that the charge current is stable if a change in the charge current remains smaller than a prescribed third change threshold value for a prescribed third period.

8. The battery voltage equalization device according to claim 7, wherein the control unit ends the voltage equalization control in response to the change in the charge current exceeding a prescribed fourth change threshold value during the execution of the voltage equalization control while charging.

9. The battery voltage equalization device according to claim 6, wherein the control unit determines that the charge current is stable if the charge current remains greater than a prescribed third current threshold value for a prescribed fourth period.

10. The battery voltage equalization device according to claim 9, wherein the control unit ends the voltage equalization control the charge current falling below a prescribed fourth current threshold value during the execution of the voltage equalization control while charging.

* * * * *